Figure 1:
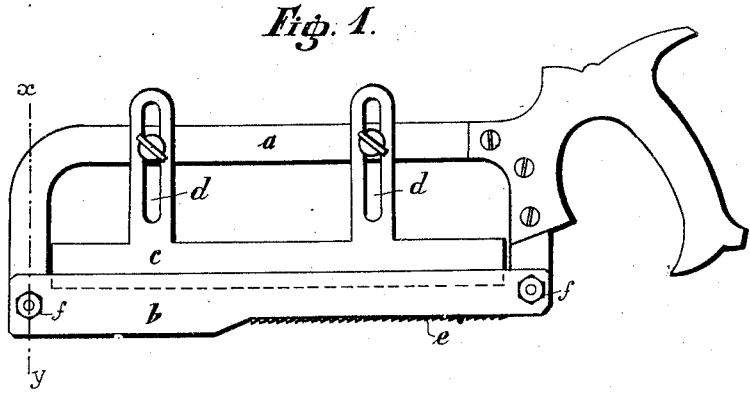

Sept. 24, 1929.  P. A. AUBIN  1,729,092

TENON SAW

Filed March 29, 1928

Inventor
Percy Adrian Aubin.
per Y. Gevern
Attorney.

Patented Sept. 24, 1929

1,729,092

UNITED STATES PATENT OFFICE

PERCY ADRIAN AUBIN, OF ST. AUBIN'S, JERSEY, CHANNEL ISLANDS

TENON SAW

Application filed March 29, 1928, Serial No. 265,651, and in Great Britain June 27, 1927.

This invention relates to tenon saws and has for its object to provide an improved hand tool of this character which is particularly adapted for cutting tenons of the multiple box type, that is tenons formed with parallel sides and intervening mortises or kerfs, in one of the two boards to be joined together, for engagement with correspondingly formed mortises or kerfs and tenons in the other board and which ensures that each cut is at the correct distance from that previously formed and is of the correct depth.

With this and other objects and advantages in view, as will appear from the following description of my invention, a hand tool constructed in accordance therewith comprises a saw blade of sufficient thickness for cutting a mortise or kerf of the required width of the tenons, with which is combined a distance gauge which whilst ensuring that each successive kerf is started along the correct direction and at the correct distance from the preceding kerf, or from the edge of the board in the case of the first kerf being cut, also allows each kerf to be cut to the correct depth, so leaving intact tenons of the correct width between two successive cuts or mortises, and also an adjustable depth gauge for regulating the depth of the kerfs or cuts and so ensuring that these will be all cut to a depth previously determined as appropriate to the thickness of the boards which are to be joined together.

In a convenient constructional form of my invention the saw blade may be secured by bolts at its ends to the depending legs of a D-shaped frame which has a convenient handle by which the saw may be operated. The aforesaid distance gauge is parallel to the saw blade and may be secured to the opposite side of the frame by the bolts fixing the saw blade thereto, the said gauge being formed as a bar of such width and so arranged that for a certain portion of its length its bottom edge projects below the cutting surface of the saw at its forward end, while for the remainder of its length the bottom edge is slightly above the said cutting surface. The portion projecting below the cutting surface of the saw allows of each cut being started in the correct position and along a direction parallel to that of the previously cut kerf, said projecting portion engaging said previously cut kerf when the teeth of the saw are applied on the upper surface of the board for starting the next kerf. The remaining shorter portion of the gauge allows of finishing each cut to the correct depth. The distance between the inner edge of the saw blade and the inner edge of the distance gauge is exactly equal to the width of the cutting surface of the saw blade and hence exactly equal to the width of the kerfs or mortises cut thereby and to the width of the tenons.

The aforesaid depth gauge is also formed as a bar and provided with two arms that are slotted for engagement by two thumb or butterfly headed screws on the back of the saw frame whereby the depth to which the said bar projects downwardly between the saw blade and the distance gauge may be regulated and fixed according to the depth of cut required, the lower edge of the said bar limiting the depth and ensuring that all the kerfs are cut to the same depth.

Figure 2:
Figure 4:
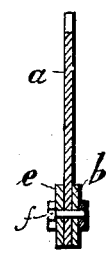
Figure 3:
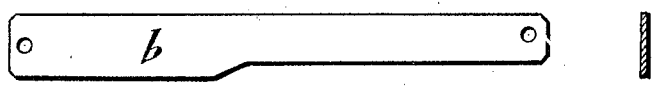

In the accompanying drawing I have shown how my said invention may be conveniently and advantageously carried out in practice:

Fig. 1 shows a side elevation;

Fig. 2 a plan showing the relative positions of saw blade, width gauge and depth gauge;

Fig. 3 the width gauge in side view and section;

Fig. 4 is a section on the line X—Y of Fig. 1.

$a$ is the frame to which the saw blade, width gauge and depth gauge are attached; $b$ is the width gauge or fence; $c$ is the depth gauge attached to the frame by two thumb screws passing through slots $d$ in the depth gauge; $e$ is the saw blade; $f, f$ are the bolts holding the saw blade and width gauge to the frame.

The hand tool according to the invention will cut multiple box type tenons of correct depth and correctly spaced in all woods, including plywood, without any preliminary marking out of the pieces of wood to be joined. The complete tool will produce the components of a perfect joint, even in plywood, in the hands of a very moderately skilled operator.

I claim:

1. A hand tool of the type set forth comprising in combination: a D-shaped frame provided with a handle, a saw blade secured to said frame on one side thereof, a width gauge secured to the opposite side of the frame with regard to the saw blade, said width gauge being formed as a bar parallel to the saw blade, the arrangement being such that for a certain portion of length of the width gauge its bottom edge projects below the cutting surface at the forward end of the saw blade, while for the remainder of its length the bottom edge is slightly above the said cutting surface.

2. A hand tool of the type set forth comprising in combination: a D-shaped frame provided with a handle, a saw blade secured to said frame on one side thereof, a width gauge secured to the opposite side of the frame with regard to the saw blade, said width gauge being formed as a bar parallel to the saw blade, the arrangement being such that for a certain portion of length of the width gauge its bottom edge projects below cutting surface at the forward end of the saw blade, while for the remainder of its length the bottom edge is slightly above the said cutting surface, the distance between the sides facing each other of the saw blade and the width gauge being exactly equal to the width of the cutting surface of the saw blade and hence equal to the width of the kerfs or mortises cut thereby and to the width of the tenons.

3. A hand tool of the type set forth comprising in combination a D-shaped frame provided with a handle, a saw blade secured to said frame on one side thereof, a width gauge secured to the opposite side of the frame with regard to the saw blade, said width gauge being formed as a bar parallel to the saw blade, the arrangement being such that for a certain portion of length of the width gauge its bottom edge projects below the cutting surface at the forward end of the saw blade, while for the remainder of its length the bottom edge is slightly above the said cutting surface, the distance between the sides facing each other of the saw blade and the width gauge being exactly equal to the width of the cutting surface of the saw blade, an adjustable depth gauge, also formed as a bar, secured to the frame and disposed between the saw blade and the width gauge, ensuring all the kerfs being cut to the exact depth required for the thickness of wood being operated upon.

4. A tool for multiple box type tenons, comprising a frame, a saw blade secured to said frame and a width gauge also secured thereto in parallel relation to the saw blade and having a portion projecting substantially below the cutting surface of the saw blade, in view of ensuring that each cut is started in the correct position and along the correct direction, whilst also allowing of each cut being finished to the correct depth.

In testimony whereof I signed hereunto my name.

PERCY ADRIAN AUBIN.